(12) United States Patent
Lee et al.

(10) Patent No.: US 9,758,631 B2
(45) Date of Patent: Sep. 12, 2017

(54) METHOD OF MODIFYING SUBSTRATE SURFACE (71) Applicant: NATIONAL TSING HUA UNIVERSITY, Hsinchu (TW)

(72) Inventors: Gwo-Bin Lee, Hsinchu (TW); Yu-Dong Ma, Taoyuan (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 0 days.

(21) Appl. No.: 14/853,672

(22) Filed: Sep. 14, 2015

(65) Prior Publication Data

US 2016/0362781 A1  Dec. 15, 2016

(30) Foreign Application Priority Data

Jun. 12, 2015  (TW) .............................. 104119129 A (51) Int. Cl.
  C23C 16/02 (2006.01)
  C08J 7/18 (2006.01)
  C08J 7/12 (2006.01)
  B05D 3/14 (2006.01)
  B05D 5/10 (2006.01)
  B29C 59/14 (2006.01)
  C08J 3/24 (2006.01)
  C08J 7/04 (2006.01)

(52) U.S. Cl.
  CPC .............. C08J 7/18 (2013.01); B05D 3/144 (2013.01); B05D 5/10 (2013.01); B29C 59/14 (2013.01); C08J 3/24 (2013.01); C08J 7/047 (2013.01); C08J 7/123 (2013.01); C08J 2383/04 (2013.01); C08J 2433/06 (2013.01)

(58) Field of Classification Search
  CPC ................................. C23C 16/02; C08J 7/123
  See application file for complete search history.

(56) References Cited

U.S. PATENT DOCUMENTS 8,383,025 B2 * 2/2013 Li ....................... C08B 37/0021
                                                156/500
2006/0088666 A1 * 4/2006 Kobrin ..................... B05D 1/60
                                                427/569

(Continued)

FOREIGN PATENT DOCUMENTS

GB  WO 2013059762 A1 *  4/2013  ............. H01L 24/95

OTHER PUBLICATIONS

E. Holczer, et al., "Surface modification of PDMS based microfluidic systems by tensides", Materials Science Forum, vol. 729, pp. 361-366, Nov. 2012.

(Continued)

Primary Examiner — Dah-Wei D Yuan
Assistant Examiner — Kristen A Dagenais
(74) Attorney, Agent, or Firm — Muncy, Geissler, Olds & Lowe, P.C.

(57) ABSTRACT

A method of modifying substrate surface includes: performing an $O_2$ plasma treatment on a substrate including polydimethylsiloxane (PDMS); coating hydrophilic UV curing coating uniformly on the substrate; disposing the substrate into an oxygen-free environment; and exposing to an UV light to cure the hydrophilic UV curing coating. The method of modifying substrate surface may greatly enhance the hydrophilicity and the stability of the PDMS substrate.

9 Claims, 5 Drawing Sheets (56) References Cited

U.S. PATENT DOCUMENTS

2011/0014499 A1* 1/2011 Uchida ................. B82Y 10/00
                                                           428/846
2013/0165586 A1* 6/2013 Hashimoto ............ C08C 19/28
                                                           525/126

OTHER PUBLICATIONS

L. G. Rigat-Brugarolas, et al., "Highly hydrophilic microfluidic device prototyping using a novel poly(dimethylsiloxane)-based polymeric mix", RSC Adv., vol. 5, pp. 7423-7425, 2015.

* cited by examiner

METHOD OF MODIFYING SUBSTRATE SURFACE

CROSS-REFERENCE TO RELATED APPLICATION

This application claims priority from Taiwan Patent Application No. 104119129, filed on Jun. 12, 2015, in Taiwan Intellectual Property Office, the contents of which are hereby incorporated by reference in their entirety for all purposes

BACKGROUND OF THE INVENTION

Field of the Invention

The exemplary embodiment(s) of the present invention relates to a field of a method of surface modification. More specifically, the exemplary embodiment(s) of the present invention relates to a method of modifying surface for substrate including polydimethylsiloxane (PDMS).

Description of Related Art

Microelectromechanical system has been rapid developed for decades. It combines microelectronic technology and mechanical engineering, and provides electrical machineries with operation scale within microns. Currently, the microelectromechanical system has been widely applied to a number of fields by various processing technologies. Among those fields, microfluidics are made by integrating the miniaturized testing instruments and flow channels onto a chip via microelectromechanical system processing technology, greatly decreasing examining cost and increasing analyzing efficiency. With sampling, mixing, reacting and detecting samples (fluids) in the micro-tube, the problem such as consumption of reagents, human pollutions, etc. may be reduced. It is also called a microfluidic system, such as, biomedical chips, gene chips, protein chips, etc., which is widely applied in the field of medical examination, food examination, and environment examination.

At present, the known materials for manufacturing the microfluidic system include organic silicon compounds, in which polydimethylsiloxane (PDMS) is most common one. The chemical structure of PDMS is shown as:

which is a high polymer of an organic silicon compound. The liquid phase of PDMS is sticky, inert, non-toxic and low volatility; the solid phase of PDMS is a type of silicone, with the characteristics of optical transmittance, and in general, inert, non-toxic and non-inflammable. In the application of the biomedical chips, the high optical transmittance and high elasticity may make the biomedical chips fit into requirements of various examining conditions and situations. In addition, for PDMS, the cost is much lower and the manufacturing process is faster, which are beneficial for industrial manufacturing processes.

While the surface of the PDMS in solid phase is highly hydrophobic, it is not suitable for applying the PDMS in solid phase to the biomedical chips and the microfluidic system. When PDMS is utilized for manufacturing the biomedical chips, it is needed to modify the surface of the PDMS and make it from hydrophobic to hydrophilic.

Known surface modification technologies in the art comprise: (1) plasma treatment: (2) pre-mix/pre-doping with chemicals (*Materials Science.* 2012, 729, 361-366); (3) covalent modification (*RSC Adv.,* 2015, 5, 7423-7425), etc. Those surface modification technologies in prior art convert the hydrophobic alkyl groups on the PDMS surface to the groups with polarity, e.g. hydroxyl groups, to enhance a hydrophilicity of the PDMS surface. However, the hydrophilicity of the PDMS surface after modification by above-mentioned technologies will be rapidly degraded in short periods of time, the transparency of the PDMS solids will be decreased and the ability to attach to other materials will be reduced. Further, the steps of some of modification processes are complicated and time-consuming, and cost great fortune, which are not benefit for industrial massive production.

SUMMARY OF THE INVENTION

For aforementioned problems in the prior art, the purpose of present invention is to provide a method of modifying surface with low cost and be suitable for massive production, while the modified surface is provided with stable hydrophilicity. Therefore, the aforementioned problems regarding surface modification in the prior art may be solved.

According to the purpose, the present invention provides a method of modifying substrate surface, which comprising: performing an $O_2$ plasma treatment on a substrate including polydimethylsiloxane (PDMS); coating a hydrophilic UV curing coating uniformly on a surface of the substrate; disposing the substrate into an oxygen-free environment; and exposing the surface of the substrate to an UV light to cure the hydrophilic UV curing coating.

Preferably, the $O_2$ plasma treatment may be performed by a power of 30-90 watt.

Preferably, the $O_2$ plasma treatment may be performed for 15-100 seconds.

Preferably, the hydrophilic UV curing coating may be selected from the group consisting of dioxetanedione, vinyl ether, acrylic resin, phenol formaldehyde resin, polymerized siloxanes, cyclic olefin copolymer, polyimide (PI), polyhydroxystyrene, polyurethane (PU) and benzocyclobutene.

Preferably, the acrylic resin may further comprise epoxy acrylate, polyurethane-acrylate (PUA), polyether acrylate, polyester acrylate (PEA), and polymethylmethacrylate (PMMA).

Preferably, the phenol formaldehyde resin may comprise phenolic epoxy resin (EPN).

According the purpose, the method of modifying substrate surface of the present invention may further comprise aerating an inert gas into a chamber to form the oxygen-free environment.

Preferably, the method of the present invention may further comprise removing gas from the chamber to form a vacuum environment.

Preferably, the temperature of the oxygen-free environment may be kept between 60-70° C.

Preferably, in the method of the present invention, the time period exposing the surface of the substrate to the UV light may be 30-60 minutes.

In summary, the $O_2$ plasma treatment and the UV curing coating are combined in the present invention for the first time, making the UV curing coating to form a thin film effectively on the $O_2$ plasma-treated surface and the modified surface of PDMS to be hydrophilic. According to the method of modifying the substrate surface, the present invention may have one or more following advantages:

(1) The surface hydrophilicity of the modified PDMS surface may be greatly enhanced by combining the $O_2$ plasma treatment step and the UV curing coating step according to an embodiment of the method of modifying the substrate surface in the present application.

(2) The hydrophilic stability of the modified PDMS surface may be greatly enhanced by combining the $O_2$ plasma treatment step and the UV curing coating step according to an embodiment of the method of modifying the substrate surface in the present application.

(3) By combining the $O_2$ plasma treatment step and the UV curing coating step, the physical and chemical properties of the PDMS solids, per se, may not be affected, and its elasticity and flexibility are maintained according to an embodiment of the method of modifying the substrate surface in the present application.

(4) Through combining the $O_2$ plasma treatment step and the UV curing coating step, the manufacturing processes become simple and easy with rapid reaction time, and the processing costs will be decreased so as to be suitable for massive production, according to an embodiment of the method of modifying the substrate surface in the present application.

With these and other objects, advantages, and features of the invention that may become hereinafter apparent, the nature of the invention may be more clearly understood by reference to the detailed description of the invention, the embodiments and to the several drawings herein.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PREFERRED EMBODIMENTS

Exemplary embodiments of the present invention are described herein in the context of a method of modifying substrate surface.

Those of ordinary skilled in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

Herein, the term "substrate" refers to an object with surface being modified. The object can be made of various materials, including, but not limited to, for example, polydimethylsiloxane (PDMS). The substrate can be combined or assembled with one or more other materials, including, but not limited to, glass, wood, metal, etc.; the substrate can be any shapes and structures, including, but not limited to, plane, sheet, thin plate, irregular surface, multi-layer, sphere, blocks, etc.

Herein, the terms "UV curing coating" or "curing coating" or "light curing coating" refers to the material that can be transformed from liquid phase to solid phase with irradiation of UV light. The UV curing materials in the art includes, but not limits to, for example, dioxetanedione, vinyl ether, acrylic resin (e.g. epoxy acrylate, polyurethane-acrylate (PUA), polyether acrylate, polyester acrylate (PEA), and polymethylmethacrylate (PMMA)), phenol formaldehyde resin (e.g. phenolic epoxy resin), polymerized siloxanes, cyclic olefin copolymer, polyimide (PI), polyhydroxystyrene, polyurethane (PU) and benzocyclobutene. Those skills in the art will appreciate that still a number of other light curing coating materials can be considered as suitable curing materials for the purpose of particular reactions.

Herein, the term "inert gas" refers to the gas which is characterized by colorless, odorless, electronically stable states in the standard temperature and pressure. It is not limited to the strictly defined inert gas in chemical fields. The "inert gas" refers to "gas having inert characters", which includes but not limited to, elements in group VIIIA of the chemical periodic table (e.g. He, Ne, Ar, Kr, Xe, Rn) and Nitrogen.

The method of modifying substrate surface will be described in accordance with embodiments of the present invention as follows. For easy to understand, the same reference numerals indicate the same elements in the following embodiments. It is noted that experiment data disclosed by each embodiment is intended to explain the technical features of the present invention, instead of limiting the implemented aspects.

In accordance with an embodiment of the present invention, the method of modifying substrate surface comprises the following steps: performing the $O_2$ plasma treatment on a substrate containing polydimethylsiloxane (PDMS); coating the hydrophilic UV curing coating evenly on the surface of the substrate, disposing the substrate into an oxygen-free environment; and exposing the surface of the substrate to the UV light to cure the hydrophilic UV curing coating.

Figure 1:
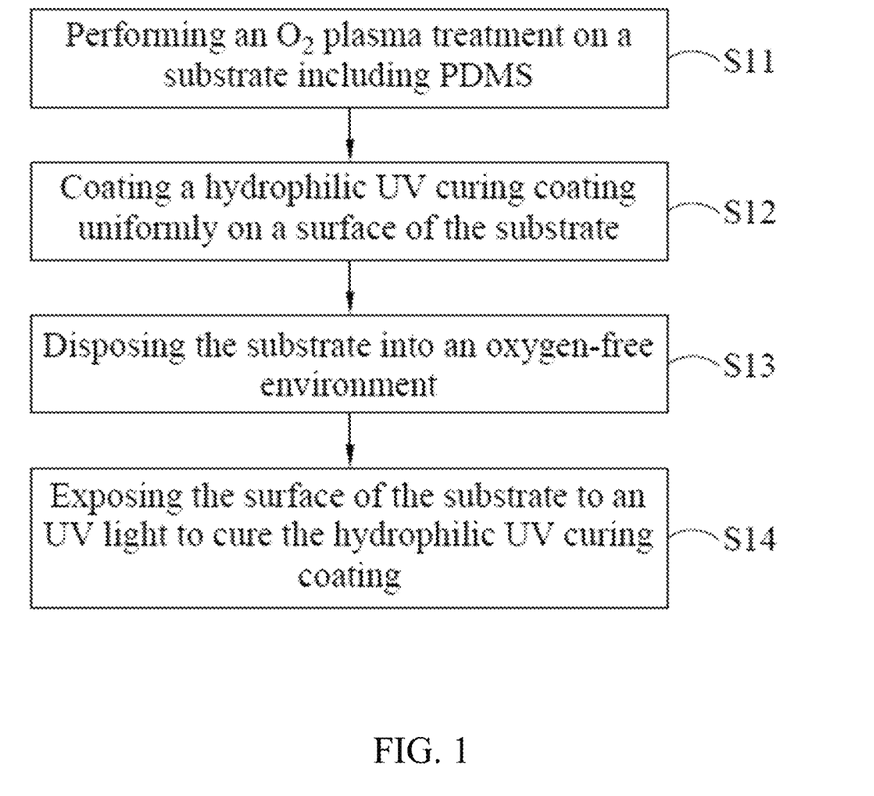
FIG. 1 illustrates a flow chart of a method of modifying substrate surface in accordance with embodiment 1 of the present invention.

As mentioned above, embodiment 1 is provided. Please refer to FIG. 1, which illustrates the flow chart of a method of modifying substrate surface in accordance with embodiment 1 of the present invention. According to the embodiment 1, the method of modifying substrate surface in the present invention at least comprises steps S11 to S14. As shown in FIG. 1, at first, the $O_2$ plasma treatment is performed on a substrate containing polydimethylsiloxane (PDMS) (S11); the hydrophilic UV curing coating is uniformly coated on the surface of the substrate (S12); the substrate is disposed into an oxygen-free environment (S13); and finally the surface of the substrate is exposed to the UV light to cure the hydrophilic UV curing coating (S14).

In addition, the hydrophilic UV curing coating may be selected from the group consisting of dioxetanedione, vinyl ether, acrylic resin (e.g. epoxy acrylate, polyurethane-acrylate (PUA), polyether acrylate, polyester acrylate (PEA), and polymethylmethacrylate (PMMA)), phenol formaldehyde resin (e.g. phenolic epoxy resin), polymerized siloxanes, cyclic olefin copolymer, polyimide (PI), polyhydroxystyrene, polyurethane (PU) and benzocyclobutene.

In accordance with an embodiment of the present invention, the method of modifying substrate surface comprises the following steps: performing the an $O_2$ plasma treatment on a substrate containing polydimethylsiloxane (PDMS); coating the hydrophilic UV curing coating evenly on the surface of the substrate: aerating an inert gas into a chamber to form an oxygen-free environment; disposing the substrate into the oxygen-free environment; removing gas from the chamber to form a vacuum environment; and exposing the surface of the substrate to the UV light to cure the hydrophilic UV curing coating.

Figure 2:
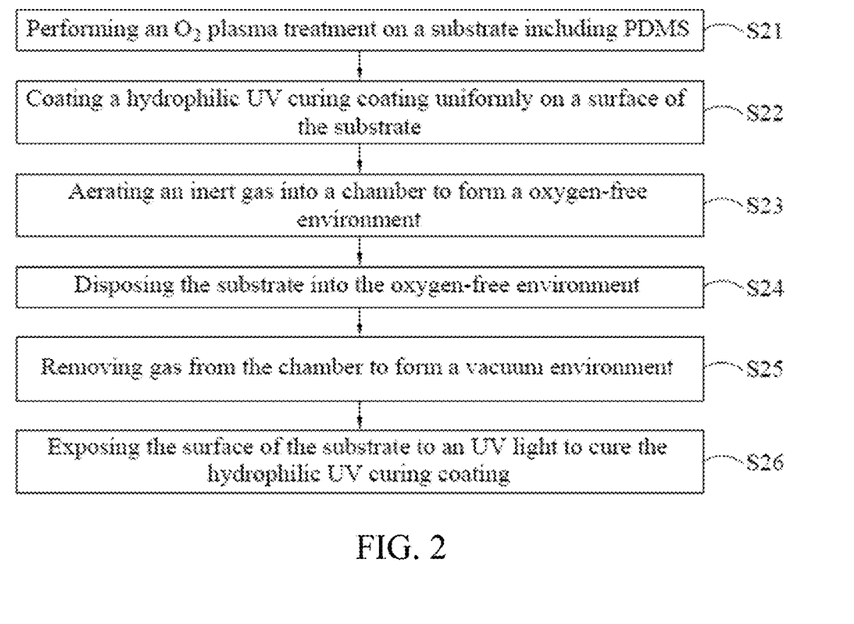
FIG. 2 illustrates a flow chart of a method of modifying substrate surface in accordance with embodiment 2 of the present invention.

As mentioned above, then the embodiment 2 is provided, also please refer to FIG. 2. FIG. 2 is a flow chart of a method of modifying substrate surface in accordance with embodiment 2 of the present invention. According to the embodiment 2, the method of modifying substrate surface comprises at least steps S21 to S26. As shown in FIG. 2, firstly, the $O_2$ plasma treatment is performed on the substrate containing polydimethylsiloxane (PDMS) (S21); the hydrophilic UV curing coating is evenly coated on the surface of the substrate (S22); an inert gas is aerated into the chamber to form the oxygen-free environment (S23); the substrate is disposed into the oxygen-free environment (S24); the gas is removed from the chamber to form a vacuum environment (S25); and finally the surface of the substrate is exposed to the UV light to cure the hydrophilic UV curing coating (S26).

In addition, the hydrophilic UV curing coating may be selected from the group consisted of dioxetanedione, vinyl ether, acrylic resin (e.g. epoxy acrylate, polyurethane-acrylate (PUA), polyether acrylate, polyester acrylate (PEA), and polymethylmethacrylate (PMMA)), phenol formaldehyde resin (e.g. phenolic epoxy resin), polymerized siloxanes, cyclic olefin copolymer, polyimide (PI), polyhydroxystyrene, polyurethane (PU) and benzocyclobutene.

Figure 3:
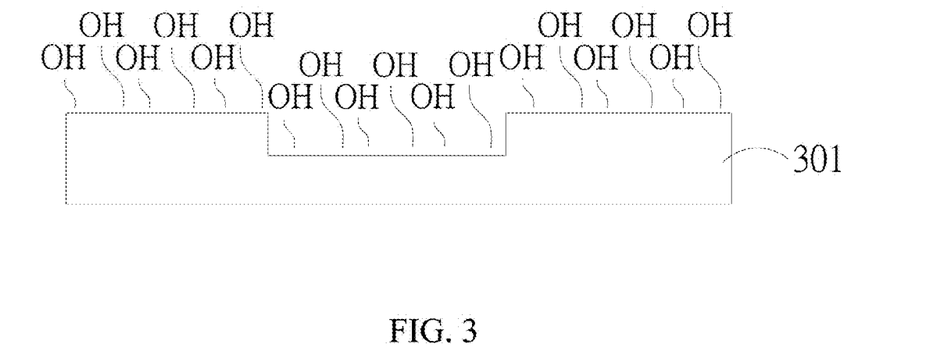
FIGS. 3-7 illustrate schematic diagrams of the process of the method of modifying substrate surface in accordance with embodiment 3 of the present invention.
Figure 4:
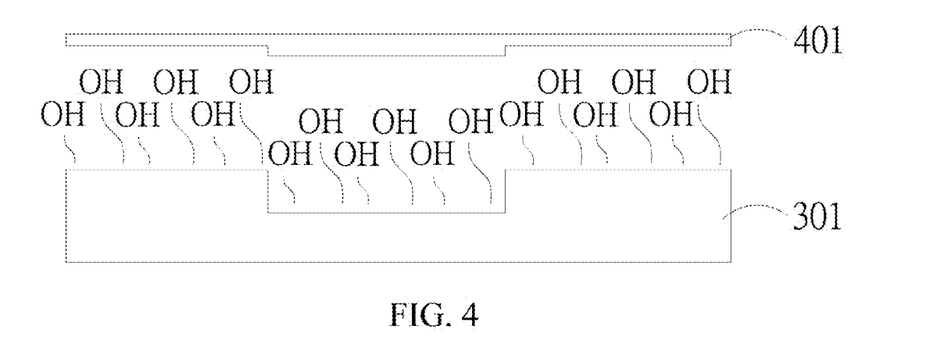

According to an embodiment of the present invention, referring to FIGS. 3-7, FIGS. 3-7 illustrate schematic diagrams of the process of the method of modifying substrate surface in accordance with embodiment 3 of the present invention. Firstly, the surface of the substrate 301, containing non-solidified PDMS, to be modified is treated with $O_2$ plasma. The PDMS substrate is in semi-solidified state after the treatment. When the $O_2$ plasma treatment is performed on the surface of the PDMS substrate 301, the alkyl groups on the surface will be converted into hydrophilic functional group with polarity (hydroxyl group). At the same time, the hydrophilicity of the surface of the PDMS substrate 301 will be enhanced, which facilitates subsequent coating and attaching processes with hydrophilic coating materials (FIG. 3). The lowest energy of the $O_2$ plasma treatment is 900 Joule, hence the power may be set to be 30-90 watt, and the treatment time may be 15-100 seconds.

Then, the hydrophilic UV curing coating is uniformly coated on the surface of the PDMS substrate 301, which has been treated by $O_2$ plasma treatment (FIG. 4), to form an UV curing coating layer 401. The hydrophilic UV curing coating may be selected from the group consisting of dioxetanedione, vinyl ether, acrylic resin, phenol formaldehyde resin, polymerized siloxanes, cyclic olefin copolymer, polyimide (PI), polyhydroxystyrene, polyurethane (PU) and benzocyclobutene. Among those curing coatings, the preferable acrylic resin may be epoxy acrylate, polyurethane-acrylate, polyether acrylate, polyester acrylate, or polymethylmethacrylate. In addition, the phenol formaldehyde resin may be phenolic epoxy resin.

Figure 5:
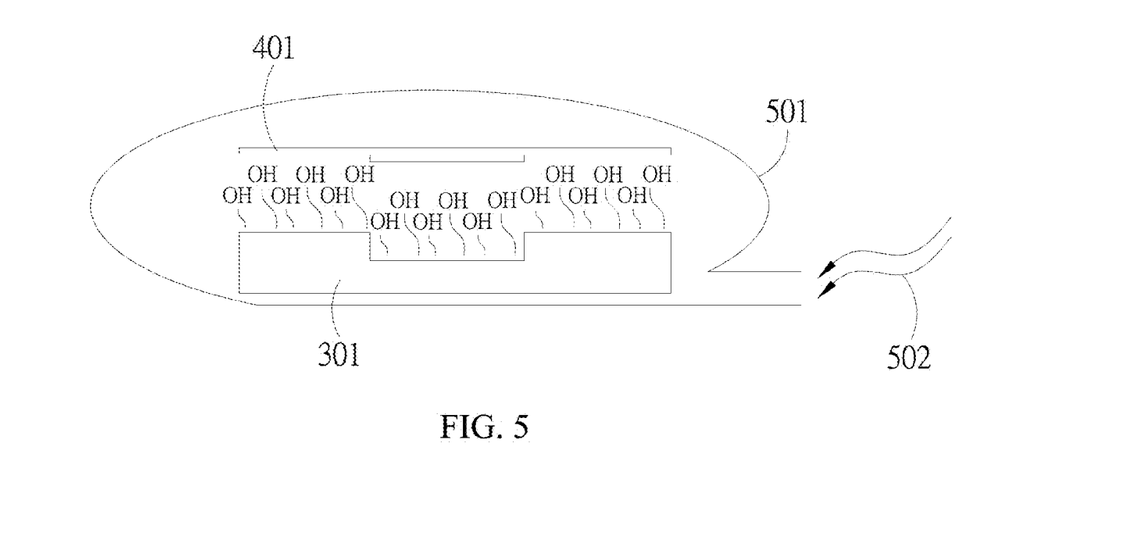

After that, the PDMS substrate 301 is placed into a chamber 501. Preferably, the chamber 501 may be a transparent plastic bag or box. It should be noted that, those example used in the embodiments of the present invention is only exemplary rather than limitary, and those skills in the art may implement the present invention with other containers of any shapes, sizes or materials. After that, in order to expel the oxygen completely from the chamber 501, an inert gas 502 is aerated into the chamber 501. Thus, an oxygen-free environment is made. Oxidation reaction between oxygen and the polarized functional group on the surface of the $O_2$ plasma-treated substrate, which causes degradation of the hydrophilicity of the surface, may be avoided in this oxygen-free environment. The inert gas 502 is selected from the group consisting of He, Ne, Ar, Kr, Xe, Rn and $N_2$, and preferably nitrogen gas.

Figure 6:
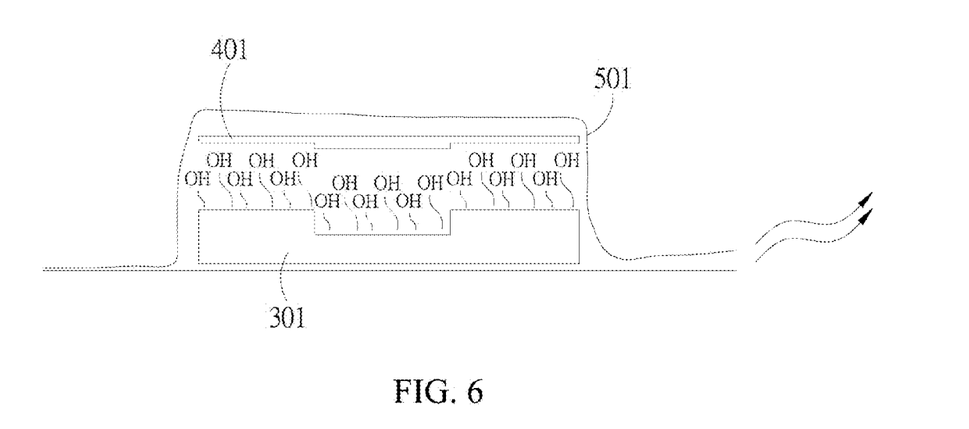

After the chamber 501 filled with the inert gas without oxygen, the inert gas 502 is removed from the chamber 501 to create a vacuum environment (FIG. 6). Under the vacuum environment, it can be ensured that the UV curing coating layer 401 and the PDMS substrate 301 both are tightly adhered (attached) to each other, and thus the effectiveness of the coating protection is confirmed.

Figure 7:
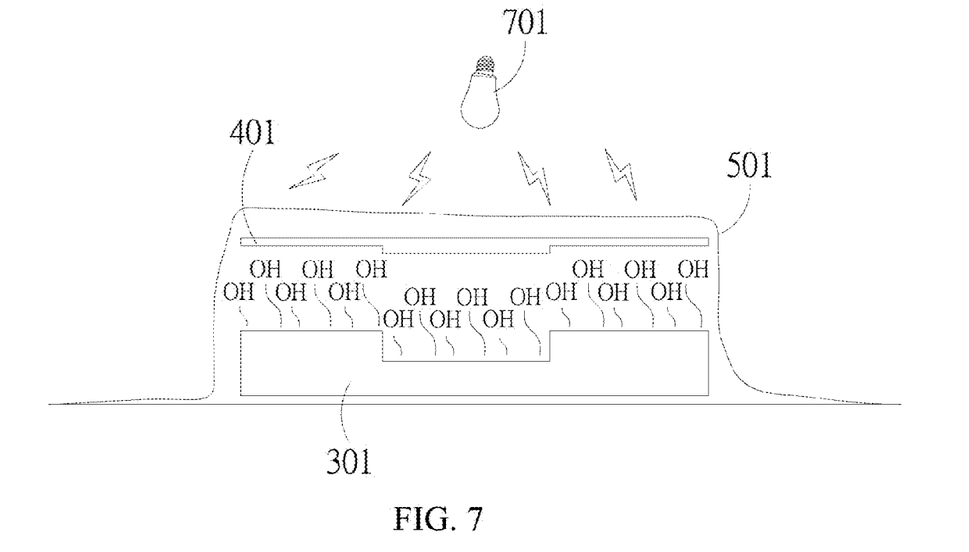

Finally, the UV curing coating layer 401 is solidified by exposing to the low power UV light 701. The preferable solidifying temperature for the UV curing coating is kept at 60-70° C. (FIG. 7). Under the solidifying temperature, not only the UV curing coating but also the semi-solidified PDMS substrate 301 may achieve the solid state completely. In other words, the semi-finished products may be made as final solids phase through only one solidifying process at the same time. The period of exposing the surface of the PDMS substrate to the UV light is 30-60 minutes, which depends on conditions such as sizes of the PDMS substrate, areas of the modified surface, etc. After solidifying, the PDMS substrate 301 completes the surface modification.

The PDMS substrate modified through the method of modifying substrate surface in accordance with embodiment 3 of the present invention may have following aspects according to specific conditions of actual operation.

According to specific conditions of actual operation, the first aspect of embodiment 3 is provided. Firstly, the $O_2$ plasma treatment is performed on the surface of the un-solidified PDMS substrate to be modified. The energy that the $O_2$ plasma treatment performed on the surface of the PDMS substrate is 5400 Joule. Hence, the power is set as 90 W with performing time being 60 seconds. This process allows the hydrophilic functional groups to be formed and the hydrophilicity to be enhanced on the surface of the PDMS substrate.

Secondly, the hydrophilic UV curing coating (GL03, Contronic Corp., Taiwan) is uniformly coated on the surface of the PDMS substrate by using the spin coater (AGS-0206B, M&R nano Technology Co.).

Then, after the coating process, the coated PDMS substrate is placed into a transparent sealed bag, and Nitrogen gas is aerated into the bag to expel oxygen out of the bag, so as to ensure the oxygen-free environment in the bag.

Further, the gas in the bag is removed completely, and the bag is sealed to create a vacuum environment. That is, the PDMS substrate is disposed in a vacuum environment and isolated from the disturbance of ambient environment, such as air and humidity, to the substrate. The adhesion between the PDMS substrate and the hydrophilic UV curing coating may be improved as well.

Finally, the surface with the hydrophilic UV curing coating is exposed to the low power UV light for 30 minutes, while the temperature being kept at 62.8° C. After the PDMS substrate and the surface with the hydrophilic UV curing coating are both solidified, the whole modification process is completed.

Figure 8:
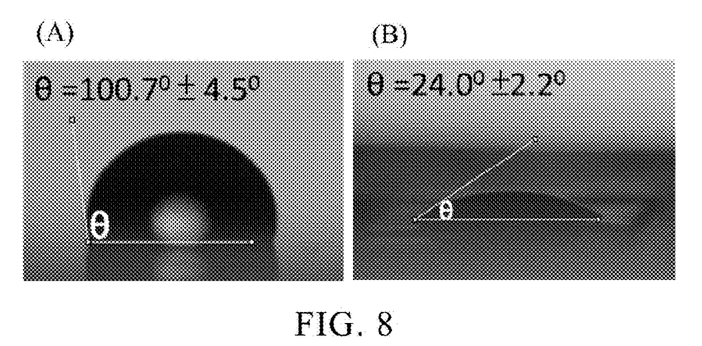
FIG. 8 illustrates a hydrophilic test result from the first aspect in accordance with embodiment 3 of the present invention.

Please refer to FIG. 8, which illustrates a hydrophilic test result from the first aspect in accordance with embodiment 3 of the present invention. As shown in the drawings, before the surface modification, the contact angle of the interface where the surface of PDMS substrate meets the droplet is θ=100.7°±4.5° (FIG. 8, part (A)). After the surface modification, the contact angle of the interface where the surface of PDMS substrate meets the droplet is θ=24.0°±2.2° (FIG. 8, part (B)). From this result, the contact angle is dramatically decreased after surface modification, which indicates the great enhancement of surface hydrophilicity. In addition, before and after the surface modification, the zeta potential on the surface of the PDMS substrate is measured to evaluate the hydrophilicity of the surface by utilizing the measured static voltage caused by accumulated ions on colloidal particles. In this aspect, the surface of un-modified PDMS substrate does not have polarity, and the zeta potential is −25.4 mV±5.8 mV; the zeta potential of the surface of the modified PDMS substrate is −46.4 mV±4.64 mV, indicating the hydrophilicity is greatly enhanced.

Here, the second aspect of embodiment 3 in accordance with the present invention is provided. Firstly, the $O_2$ plasma treatment is performed on the surface of the un-solidified PDMS substrate to be modified. The energy that the $O_2$ plasma treatment performed on the surface of the PDMS substrate is 1800 Joule. Hence, the power is set as 60 W with performing time being 30 seconds. This process allows the hydrophilic functional groups to be formed and the hydrophilicity to be enhanced on the surface of the PDMS substrate.

Secondly, the hydrophilic UV curing coating (Photocure 80113, slink, USA) is uniformly coated on the surface of the PDMS substrate by using the spin coater (AGS-0206B. M&R nano Technology Co.).

Then, after the coating process, the coated PDMS substrate is placed into a transparent soft box, and Nitrogen gas is aerating into the box to expel oxygen out of the box, so as to ensure the oxygen-free environment in the soft box.

Further, the gas in the box is removed completely, and the box is squashed and sealed to create a vacuum environment. That is, the PDMS substrate is disposed in a vacuum environment isolated from the disturbance of ambient environment, such as air and humidity, to the substrate. The adhesion between the PDMS substrate and hydrophilic UV curing coating can be improved as well.

Finally, the surface with hydrophilic UV curing coating is exposed to the low power UV light for 60 minutes, while the temperature being kept at 65.1° C. After the PDMS substrate and the surface with the hydrophilic UV curing coating are both solidified, the whole modification process is completed.

Figure 9:
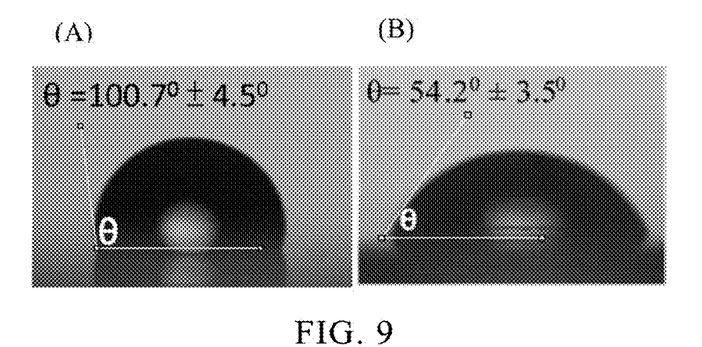
FIG. 9 illustrates a hydrophilic test result from the second aspect in accordance with embodiment 3 of the present invention.

Please reference to FIG. 9, which illustrates a hydrophilic test result from the second aspect in accordance with embodiment 3 of the present invention. As shown in the drawings, before the surface modification, the contact angle of the interface where surface of PDMS substrate meets the droplet is θ=100.7°±4.5° (FIG. 9, part (A)). After the surface modification, the contact angle of the interface where surface of PDMS substrate meets the droplet is θ=54.2±3.5° (FIG. 9, part (B)). From this result, the contact angle is dramatically decreased after the surface modification, which indicates the great increasing of surface hydrophilicity. In addition, before and after the surface modification, the zeta potential on the surface of the PDMS substrate is measured to evaluate the hydrophilicity of the surface by utilizing the measured static voltage caused by accumulated ions on colloidal particles. In this aspect, the surface of un-modified PDMS substrate does not have polarity, the zeta potential is −25.4 mV±5.8 mV; the zeta potential of the surface of the modified PDMS substrate is −40.4 mV±2.72 mV, indicating the hydrophilicity is greatly increased.

Here, the third aspect of embodiment 3 in accordance with the present invention is provided. Firstly, the $O_2$ plasma treatment is performed on the surface of the un-solidified PDMS substrate to be modified. The energy that the $O_2$ plasma treatment performed on the surface of the PDMS substrate is 2700 Joule. Hence the power is set as 90 W with performing time being 30 seconds. This process allows the hydrophilic functional groups to be formed and the hydrophilicity to be enhanced on the surface of the PDMS substrate.

Secondly, the hydrophilic UV curing coating (Photocure 80410D7, slink, USA) is uniformly coated on the surface of the PDMS substrate by using the spin coater (AGS-0206B, M&R nano Technology Co.).

Then, after the coating process, the coated PDMS substrate is placed into a transparent bag, and Nitrogen gas is aerating into the bag to expel oxygen out of the bag, so as to ensure the oxygen-free environment in the bag.

Further, the gas in the bag is removed completely, and the bag is sealed to create a vacuum environment. That is, the PDMS substrate is disposed in a vacuum environment and isolated from the disturbance of ambient environment such as air and humidity, to the substrate. The adhesion between the PDMS substrate and hydrophilic UV curing coating can be improved as well.

Finally, the surface with the hydrophilic UV curing coating is exposed to the low power UV light for 60 minutes, while the temperature being kept at 65.7° C. After the PDMS substrate and the surface with the hydrophilic UV curing coating are both solidified, the whole modification process is completed.

Figure 10:
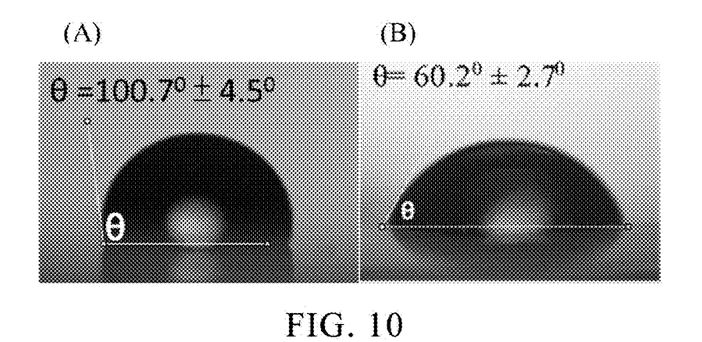
FIG. 10 illustrates a hydrophilic test result from the third aspect in accordance with embodiment 3 of the present invention.

Please reference to FIG. 10, which illustrates a hydrophilic test result from the third aspect in accordance with embodiment 3 of the present invention. As shown in the drawings, before the surface modification, the contact angle of the interface where surface of PDMS substrate meets the droplet is θ=100.7°±4.5° (FIG. 10, part (A)). After the surface modification, the contact angle of the interface where surface of PDMS substrate meets the droplet is θ=60.2°±2.7° (FIG. 10, part (B)). From this result, the contact angle is dramatically decreased after surface modification, which indicates the great enhancement of surface hydrophilicity. In addition, before and after modification, the zeta potential on the surface of the PDMS substrate is measured to evaluate the hydrophilicity of the surface by utilizing the measured static voltage caused by accumulated ions on colloidal particles. In this aspect, the surface of un-modified PDMS substrate does not have polarity, the zeta potential is −25.4 mV±5.8 mV: the zeta potential of the surface of the modified PDMS substrate is −38.8 mV±4.9 mV, indicating the hydrophilicity is greatly enhanced.

The hydrophilicity test results obtained from the three aspects of the embodiment 3 and the effectiveness of the surface modification are summarized and compared to the prior art. The comparing results among the method of modifying substrate surface according to the embodiments of the present invention and the prior art are shown as Table 1. Table 1 lists the comparison among several methods for surface modification including the method according to the embodiments of present invention. From Table 1, the method of modifying substrate surface have more beneficial effects than aforementioned prior art, either in degree of hydrophilicity or stability thereof. In addition, the method according to the embodiments of the present invention costs less time and may generate more profits.

TABLE 1

The comparison among the methods of surface modification

| Surface modification technologies | Time needed for modification | Uniform or not on the surface | Contact angles (θ) (lowest) | Stability of hydrophilicity |
|---|---|---|---|---|
| Plasma treatment | 20-60 seconds | Yes | 38.23 ± 0.23 | Only two days |
| Pre-mix/pre-doping with chemicals | >2 minutes | Yes | NA | Not stable |
| Covalent modification | 2-16 hours | No | 41.0 ± 9.5 | Stable |
| O₂ plasma + UV curing coating (present invention) | 0.5~1 hour | Yes | 24.0 ± 2.2 | Stable (Over 3 months) |

NA, not analyzed. (Colloids and Surfaces A: Physicochem. Eng. Aspects. 2012, 415, 406-412.

In summary, the hydrophilicity and the stability of modified PDMS surface are greatly enhanced by combining the $O_2$ plasma treatment and UV curing coating processes in the method of modifying substrate surface according to embodiments of the present invention. In addition, the physical and chemical properties of PDMS solids, per se, and the elasticity and the flexibility thereof are not affected by the method according to embodiments of the present invention. Further, the method according to embodiments of the present invention provides simple and easy manufacturing processes, rapid reaction time, and low processing costs, which is suitable for massive production in the industry.

While particular embodiments of the present invention have been shown and described, it will be obvious to those skilled in the art that, based upon the teachings herein, changes and modifications may be made without departing from this invention and its broader aspects. Therefore, the appended claims are intended to encompass within their scope of all such changes and modifications as are within the true spirit and scope of the exemplary embodiment(s) of the present invention.

What is claimed is:

1. A method of modifying substrate surface, comprising:
    performing an $O_2$ plasma treatment on a substrate including polydimethylsiloxane (PDMS) in an non-solidified state, the substrate is in a semi-solidified state after the $O_2$ plasma treatment;
    coating a hydrophilic UV curing coating uniformly on a surface of the substrate in the semi-solidified state;
    disposing the substrate into an oxygen-free environment; and
    exposing the surface of the substrate to an UV light at 60-70° C. to solidify the hydrophilic UV curing coating and the substrate at the same time.

2. The method of claim 1, wherein the $O_2$ plasma treatment is performed by a power of 30-90 watt.

3. The method of claim 2, wherein the $O_2$ plasma treatment is performed for 15-100 seconds.

4. The method of claim 1, wherein the hydrophilic UV curing coating is selected from the group consisting of dioxetanedione, vinyl ether, acrylic resin, phenol formaldehyde resin, polymerized siloxanes, cyclic olefin copolymer, polyimide, polyhydroxystyrene, polyurethane and benzocyclobutene.

5. The method of claim 4, wherein the acrylic resin further comprises epoxy acrylate, polyurethane-acrylate, polyether acrylate, polyester acrylate, and polymethylmethacrylate.

6. The method of claim 4, wherein the phenol formaldehyde resin comprises phenolic epoxy resin.

7. The method of claim 1, further comprising aerating an inert gas into a chamber to form the oxygen-free environment.

8. The method of claim 7, further comprising removing gas from the chamber to form a vacuum environment.

9. The method of claim 1, wherein a time period that exposing the surface of the substrate to the UV light source is 30-60 minutes.

* * * * *